(12) United States Patent
Sperry et al.

(10) Patent No.: US 7,225,599 B2
(45) Date of Patent: Jun. 5, 2007

(54) APPARATUS AND METHOD FOR FORMING INFLATED ARTICLES

(75) Inventors: Laurence B. Sperry, Newton, MA (US); Eric A. Kane, Lynn, MA (US); Brian A. Murch, Woburn, MA (US); Ross Patterson, Boston, MA (US)

(73) Assignee: Sealed Air Corporation, Elmwood Park, NJ (US)

( * ) Notice: Subject to any disclaimer, the term of this patent is extended or adjusted under 35 U.S.C. 154(b) by 98 days.

(21) Appl. No.: 11/099,289

(22) Filed: Apr. 5, 2005

(65) Prior Publication Data

US 2006/0218880 A1    Oct. 5, 2006

(51) Int. Cl.
*B65B 9/02* (2006.01)
*B65B 31/06* (2006.01)
*B65B 51/16* (2006.01)

(52) U.S. Cl. .................... 53/403; 53/450; 53/455; 53/553; 53/562; 53/374.4; 53/79

(58) Field of Classification Search .................. 53/403, 53/79, 374.4
See application file for complete search history.

(56) References Cited

U.S. PATENT DOCUMENTS

| | | | |
|---|---|---|---|
| 2,265,075 A | 12/1941 | Knuetter | |
| 2,718,105 A * | 9/1955 | Ferguson et al. | 53/548 |
| 3,196,068 A | 7/1965 | Schoder et al. | |
| 3,319,538 A | 7/1965 | Schoder et al. | |
| 3,209,513 A | 10/1965 | Cochrane | |
| 3,462,913 A | 8/1969 | Bodolay et al. | |
| 3,546,433 A * | 12/1970 | Ewing | 219/469 |
| 3,596,428 A * | 8/1971 | Young et al. | 53/451 |
| 3,660,189 A | 5/1972 | Troy | |
| 3,735,551 A * | 5/1973 | Pratt | 53/433 |
| 3,901,759 A | 8/1975 | Highfield et al. | |
| 3,938,298 A | 2/1976 | Luhman et al. | |
| 4,017,351 A | 4/1977 | Larson et al. | |
| 4,096,306 A | 6/1978 | Larson | |
| 4,169,002 A * | 9/1979 | Larson | 156/145 |
| 4,201,031 A | 5/1980 | Wiles | |
| 4,384,442 A | 5/1983 | Pendleton | |
| 4,448,011 A | 5/1984 | Pohl | |
| 4,509,820 A | 4/1985 | Murata et al. | |
| 4,512,136 A | 4/1985 | Christine | |
| 4,545,180 A | 10/1985 | Chung et al. | |
| 4,631,901 A | 12/1986 | Chung et al. | |
| 4,654,878 A | 3/1987 | Lems | |

(Continued)

FOREIGN PATENT DOCUMENTS

DE    19913408    3/1999

(Continued)

*Primary Examiner*—John Sipos
(74) *Attorney, Agent, or Firm*—Thomas C. Lagaly

(57) ABSTRACT

An apparatus for making inflated articles from a film web having two juxtaposed film plies. One version of the apparatus generally includes a first rotary sealing device for producing transverse seals that bond the film plies together, an inflation assembly for directing gas between the film plies, and a second rotary sealing device for producing a longitudinal seal between the film plies. The longitudinal seal intersects the transverse seals so that the gas is enclosed between the longitudinal seal, transverse seals, and film plies to thereby form an inflated article.

21 Claims, 11 Drawing Sheets

U.S. PATENT DOCUMENTS

| | | | |
|---|---|---|---|
| 4,674,268 A | 6/1987 | Gavronsky et al. | |
| 4,847,126 A | 7/1989 | Yamashiro et al. | |
| 4,869,048 A | 9/1989 | Boeckmann | |
| 4,893,453 A | 1/1990 | Weikert | |
| 4,999,975 A * | 3/1991 | Willden et al. | 53/451 |
| 5,032,212 A | 7/1991 | Campbell | |
| 5,042,663 A | 8/1991 | Heinrich | |
| 5,067,301 A * | 11/1991 | Shore | 53/79 |
| 5,070,675 A | 12/1991 | Chuan-Shiang | |
| 5,080,747 A | 1/1992 | Veix | |
| 5,181,365 A | 1/1993 | Garvey et al. | |
| 5,187,917 A | 2/1993 | Mykleby | |
| 5,210,993 A | 5/1993 | van Boxtel | |
| 5,216,868 A | 6/1993 | Cooper et al. | |
| 5,246,527 A | 9/1993 | Bjorkman et al. | |
| 5,254,074 A | 10/1993 | Landers et al. | |
| 5,337,539 A | 8/1994 | Barton | |
| 5,339,602 A | 8/1994 | Landers et al. | |
| 5,353,573 A | 10/1994 | Durrant | |
| 5,355,656 A | 10/1994 | Perrett | |
| 5,357,733 A | 10/1994 | Weikert | |
| 5,376,219 A | 12/1994 | Sperry et al. | |
| 5,411,625 A | 5/1995 | Focke et al. | |
| 5,427,830 A | 6/1995 | Pharo | |
| 5,441,345 A | 8/1995 | Garvey et al. | |
| 5,454,642 A | 10/1995 | De Luca | |
| 5,552,003 A | 9/1996 | Hoover et al. | |
| 5,581,983 A | 12/1996 | Murakami | |
| 5,660,662 A | 8/1997 | Testone | |
| 5,679,208 A * | 10/1997 | Sperry et al. | 156/515 |
| 5,687,545 A | 11/1997 | Baker | |
| 5,693,163 A | 12/1997 | Hoover et al. | |
| 5,699,653 A | 12/1997 | Hartman et al. | |
| 5,722,217 A | 3/1998 | Cloud | |
| 5,733,045 A | 3/1998 | Jostler et al. | |
| 5,755,082 A | 5/1998 | Takahashi et al. | |
| 5,824,392 A | 10/1998 | Gotoh et al. | |
| 5,845,463 A | 12/1998 | Henaux | |
| 5,862,653 A | 1/1999 | Solano | |
| 5,873,215 A | 2/1999 | Aquarius et al. | |
| 5,875,610 A | 3/1999 | Yuyama et al. | |
| 5,918,441 A | 7/1999 | Baker | |
| 5,937,614 A | 8/1999 | Watkins et al. | |
| 5,942,076 A | 8/1999 | Salerno et al. | |
| RE36,501 E | 1/2000 | Hoover et al. | |
| 6,035,611 A | 3/2000 | Lerner | |
| 6,058,681 A | 5/2000 | Recchia, Jr. | |
| RE36,759 E | 7/2000 | Hoover et al. | |
| 6,145,273 A | 11/2000 | Baker | |
| 6,174,273 B1 | 1/2001 | Harding | |
| 6,209,286 B1 | 4/2001 | Perkins et al. | |
| 6,375,785 B1 | 4/2002 | Aquarius | |
| 6,410,119 B1 * | 6/2002 | De Luca et al. | 428/166 |
| 6,453,644 B1 * | 9/2002 | Baker | 53/403 |
| 6,460,313 B1 | 10/2002 | Cooper | |
| 6,550,229 B2 * | 4/2003 | Sperry et al. | 53/568 |
| 6,582,800 B2 | 6/2003 | Fuss et al. | |
| 6,605,169 B2 | 8/2003 | Perkins et al. | |
| 6,635,145 B2 | 10/2003 | Cooper | |
| 6,651,406 B2 | 11/2003 | Sperry et al. | |
| 6,659,150 B1 | 12/2003 | Perkins et al. | |
| 6,761,960 B2 | 7/2004 | De Luca et al. | |
| 6,786,022 B2 * | 9/2004 | Fuss et al. | 53/403 |
| 6,804,933 B2 | 10/2004 | Sperry et al. | |
| 2002/0108352 A1 | 8/2002 | Sperry et al. | |
| 2002/0150730 A1 | 10/2002 | DeLuca et al. | |
| 2002/0166788 A1 | 11/2002 | Sperry et al. | |
| 2004/0206050 A1 | 10/2004 | Fuss et al. | |
| 2005/0188659 A1 | 9/2005 | Lerner et al. | |
| 2006/0086064 A1 | 4/2006 | Wehrmann | |
| 2006/0090421 A1 | 5/2006 | Sperry et al. | |
| 2006/0174589 A1 | 8/2006 | O'Dowd | |

FOREIGN PATENT DOCUMENTS

| | | |
|---|---|---|
| GB | 2387423 | 4/2002 |
| WO | 00/53501 | 3/2000 |
| WO | 00/43198 | 7/2000 |
| WO | 00/64672 | 11/2000 |
| WO | 00/78522 A1 | 12/2000 |
| WO | 01/53153 A1 | 7/2001 |
| WO | 01/74686 A2 | 10/2001 |
| WO | 01/85434 A2 | 11/2001 |
| WO | 02/14156 A1 | 2/2002 |
| WO | 03/086742 A1 | 10/2003 |

* cited by examiner

APPARATUS AND METHOD FOR FORMING INFLATED ARTICLES

BACKGROUND OF THE INVENTION

The present invention relates to inflated articles and, more particularly, to a simplified and improved apparatus and process for producing gas-inflated cushions for packaging.

Various apparatus and methods for forming inflated cushions, pillows, or other inflated articles are known. Inflated cushions are used to package items, by wrapping the items in the cushions and placing the wrapped items in a shipping carton, or simply placing one or more inflated cushions inside of a shipping carton along with an item to be shipped. The cushions protect the packaged item by absorbing impacts that may otherwise be fully transmitted to the packaged item during transit, and also restrict movement of the packaged item within the carton to further reduce the likelihood of damage to the item.

Conventional machines for forming inflated cushions tend to be rather large, expensive and complex. While smaller, less-expensive inflation machines have been developed more recently, such machines produce cushions at a rate which is slower than would otherwise be desired, and generally require film webs having pre-formed containers. That is, the relative simplicity of such smaller, less-complex inflation machines generally relies on the use of inflatable film webs in which much of the container-producing operation has been performed prior to placement on the machine, so that the inflation machine simply inflates and seals the pre-formed containers. While this approach has been effective, pre-converted film webs can be costly to produce and store. In addition, variations in the process of making pre-formed containers can cause alignment and tracking problems in the inflation/sealing machines, resulting in poorly-inflated and/or poorly-sealed cushions, which may deflate prematurely or otherwise fail to protect the packaged product.

Accordingly, there is a need in the art for a simpler and less expensive apparatus for producing gas-filed packaging cushions, yet one that also produces cushions at a relatively high rate of speed and does not require film webs with pre-formed containers.

SUMMARY OF THE INVENTION

Those needs are met by the present invention, which, in one aspect, provides an apparatus for making inflated articles from a film web having two juxtaposed film plies, comprising:

a. a first rotary sealing device for producing transverse seals that bond the film plies together;

b. an inflation assembly for directing gas between the film plies; and c. a second rotary sealing device for producing a longitudinal seal between the film plies. The longitudinal seal intersects the transverse seals so that the gas is enclosed between the longitudinal seal, transverse seals, and film plies to thereby form an inflated article.

Another aspect of the invention pertains to an apparatus for making inflated articles from a film web having two juxtaposed film plies, comprising:

a. a first sealing device for producing transverse seals that bond the film plies together;

b. an inflation assembly for directing gas between the film plies;

c. a sensor to detect whether a predetermined minimum amount of gas has been directed between the film plies; and d. a second sealing device for producing a longitudinal seal between the film plies, which intersects the transverse seals to thereby enclose the gas.

Still another aspect of the invention is directed to a method for making inflated articles from a film web having two juxtaposed film plies, comprising:

a. producing transverse seals with a first rotary sealing device, the transverse seals bonding the film plies together;

b. directing gas between the film plies; and c. producing a longitudinal seal between the film plies with a second rotary sealing device, which intersects the transverse seals to thereby enclose the gas.

These and other aspects and features of the invention may be better understood with reference to the following description and accompanying drawings.

DETAILED DESCRIPTION OF THE INVENTION

Figure 1:
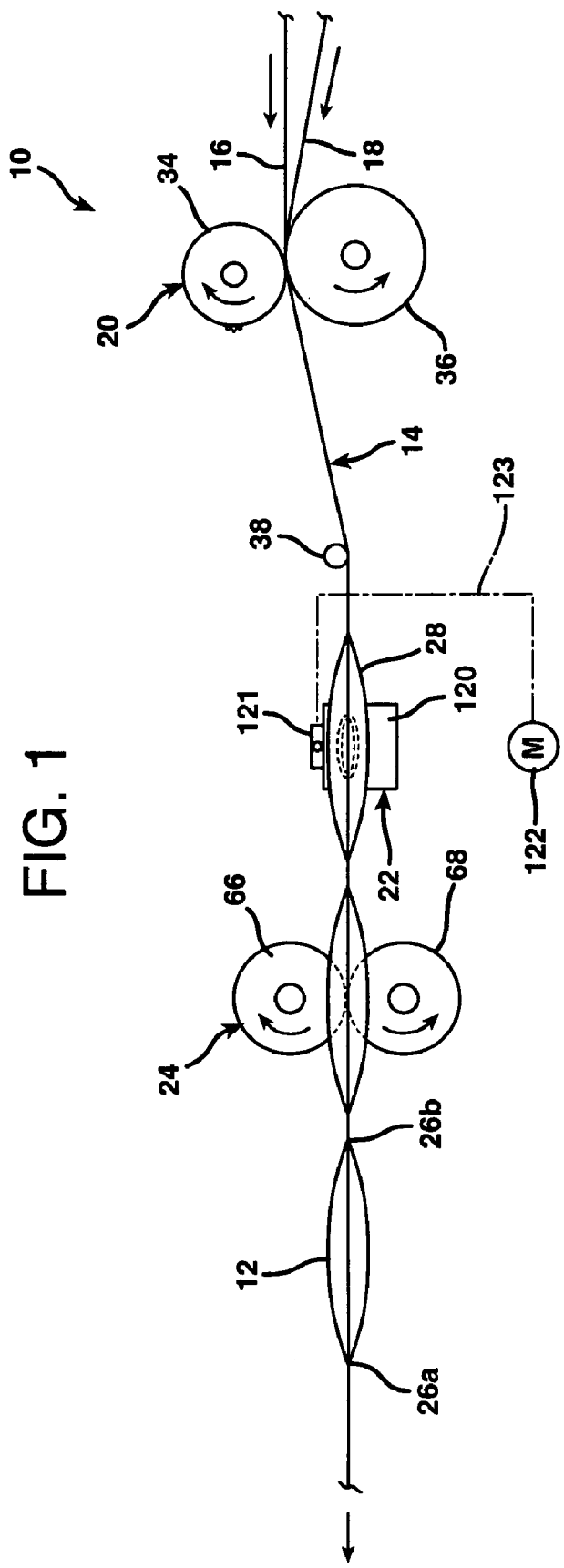
FIG. 1 is a schematic layout of an apparatus and method for forming inflated articles, e.g., inflated cushions, in accordance with the present invention.
Figure 2:
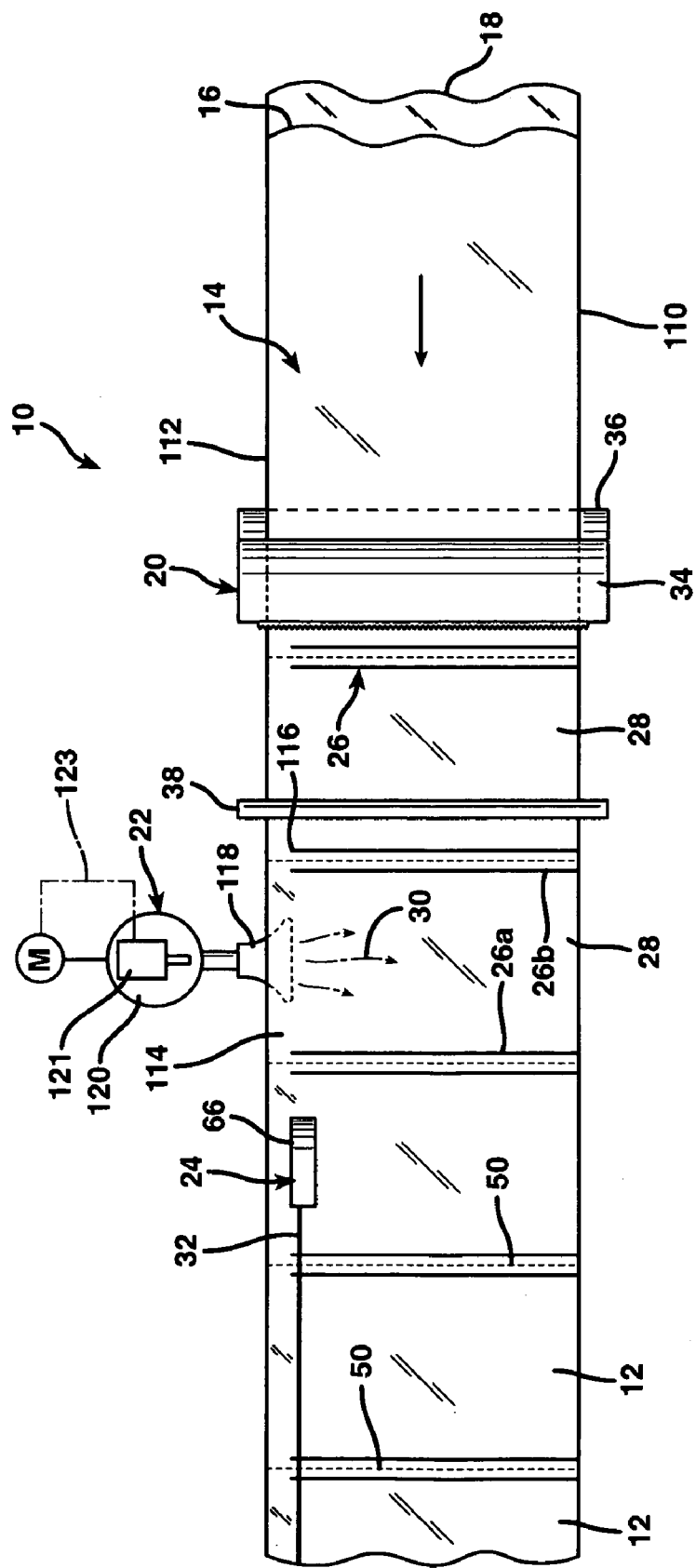
FIGS. 2 and 3 are plan and perspective views, respectively, of the apparatus and method shown in FIG. 1.
Figure 3:
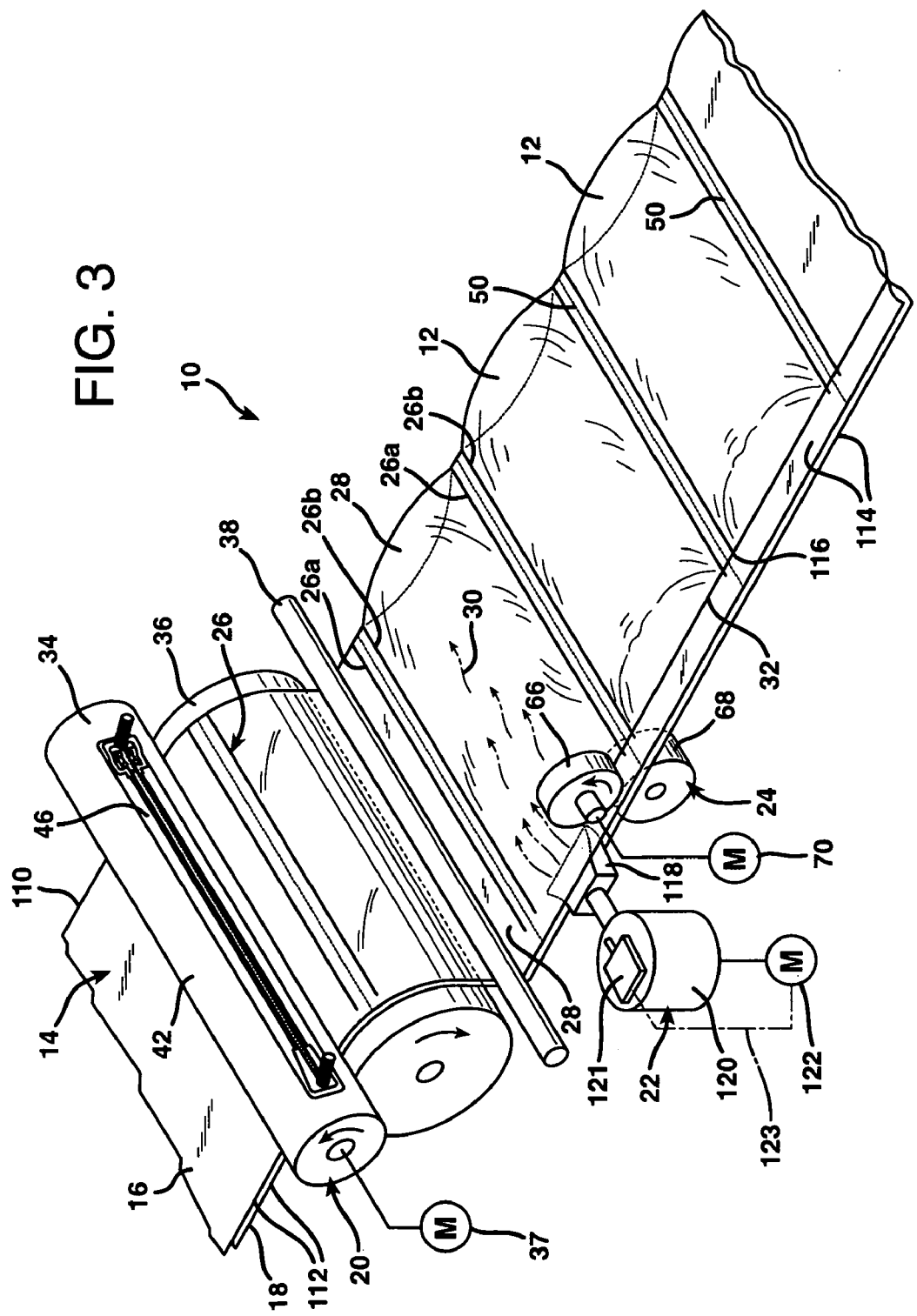

Referring collectively to FIG. 1–3, there is shown an apparatus 10 for making inflated articles 12 from a film web 14 having two juxtaposed film plies 16 and 18. Inflated articles 12 may be used as cushions, e.g., for packaging and protecting items during shipment and storage. Other uses for the inflated articles are also envisioned, e.g., as floatation devices or decorative objects.

Apparatus 10 includes a first rotary sealing device 20, an inflation assembly 22, and a second rotary sealing device 24.

First rotary sealing device 20 produces transverse seals 26 that bond the juxtaposed film plies 16, 18 together. As shown, container 28 may be defined between a pair of the transverse seals 26. For ease of reference, the 'downstream' transverse seal of each container is designated 26a while the 'upstream' seal is designated 26b.

Inflation assembly 22 directs gas, indicated by arrows 30, between film plies 16, 18 and into the containers 28 as shown.

Second rotary sealing device 24 produces a longitudinal seal 32 between film plies 16, 18. As shown, longitudinal seal 32 intersects pair 26a, b of transverse seals 26 to enclose gas 30 within container 28. In this manner, container 28 is converted into an inflated article 12.

In many embodiments of the invention, apparatus 10 produces a series of two or more containers 28 and converts them into a series of two or more inflated articles 12 as shown. Advantageously, due to the rotary nature of the first and second sealing devices 20, 24, apparatus 10 is able to move film web 14 continuously and without interruption as the series of inflated articles 12 are produced. This is opposed to an intermittent process, where the web must be started and stopped as seals are made, which occurs, e.g., in processes using reciprocating sealing devices. The use of rotary sealing devices in accordance with the present invention results in much faster production of the inflated articles because the web does not need to stop in order for seals to be made.

As shown in FIGS. 1–3, first rotary sealing device 20 may comprise a sealing roller 34 and a backing roller 36. The sealing and backing rollers 34, 36 rotate against one another to create a 'nip,' or area of tangential contact, therebetween, which exerts a rotational compressive force on film web 14. As such, sealing and backing rollers 34, 36 may be used to convey the film web through apparatus 10 when the rollers rotate in the direction indicated by the rotational arrows, which thereby drives the film web in a forward direction as indicated by the linear arrows. Thus, the rotation of one or both of rollers 34, 36 may be powered by a suitable drive mechanism, e.g., motor 37, which is shown schematically in FIG. 3.

In general, film web 14 may be conveyed through apparatus 10 along a travel path that encounters the following components, in the following order: first rotary sealing device 20, guide roller 38, inflation assembly 22, second rotary sealing device 24. The foregoing order is in no way intended to be limiting, and is merely set forth for illustration. Numerous other configurations are possible, some of which are described below.

Guide roller 38 serves to place film web 14 in alignment with inflation assembly 22, which may be useful when first rotary sealing device 20 is positioned at a different elevation than the inflation assembly. For example, in some embodiments of the invention, it may be advantageous to arrange the first rotary sealing device 20 at a higher elevation than the inflation assembly 22 and guide roller 38. This arrangement provides a longer travel path between first rotary sealing device 20 and inflation assembly 22 without unduly lengthening the housing (not shown) in which the components of apparatus 10 are contained. A longer travel path provides additional cooling/curing time for transverse seals 26 before they are subjected to a tensioning force as the containers 28 are inflated at inflation assembly 22. Various additional conventional film-guide and film-drive devices may be included as desired. Film web 14 may be supplied, e.g., from a supply roll (not shown) that is positioned, e.g., beneath the components depicted in FIGS. 1–3 but mounted, e.g., to the same frame or housing to which the other components of apparatus 10 are mounted.

As noted above, first rotary sealing device 20 produces transverse seals 26. Such seals are generally oriented in a direction that is substantially transverse, i.e., at an angle, to the direction of movement of film web 14 along its travel path through apparatus 10. Transverse seals 26 may be any type of seal that bonds two film plies together, such as a heat seal, adhesive seal, cohesive seal, etc., with heat seals being preferred. A heat seal, or heat weld, may be formed when the film plies 16, 18 are brought into contact with one another and sufficient heat is applied to one or both films in one or more predetermined segments such that at least a portion of each heated film segment becomes molten and intermixes with the other heated segment. Upon cooling, the heated segments of the two film plies become bound together.

Figure 4:
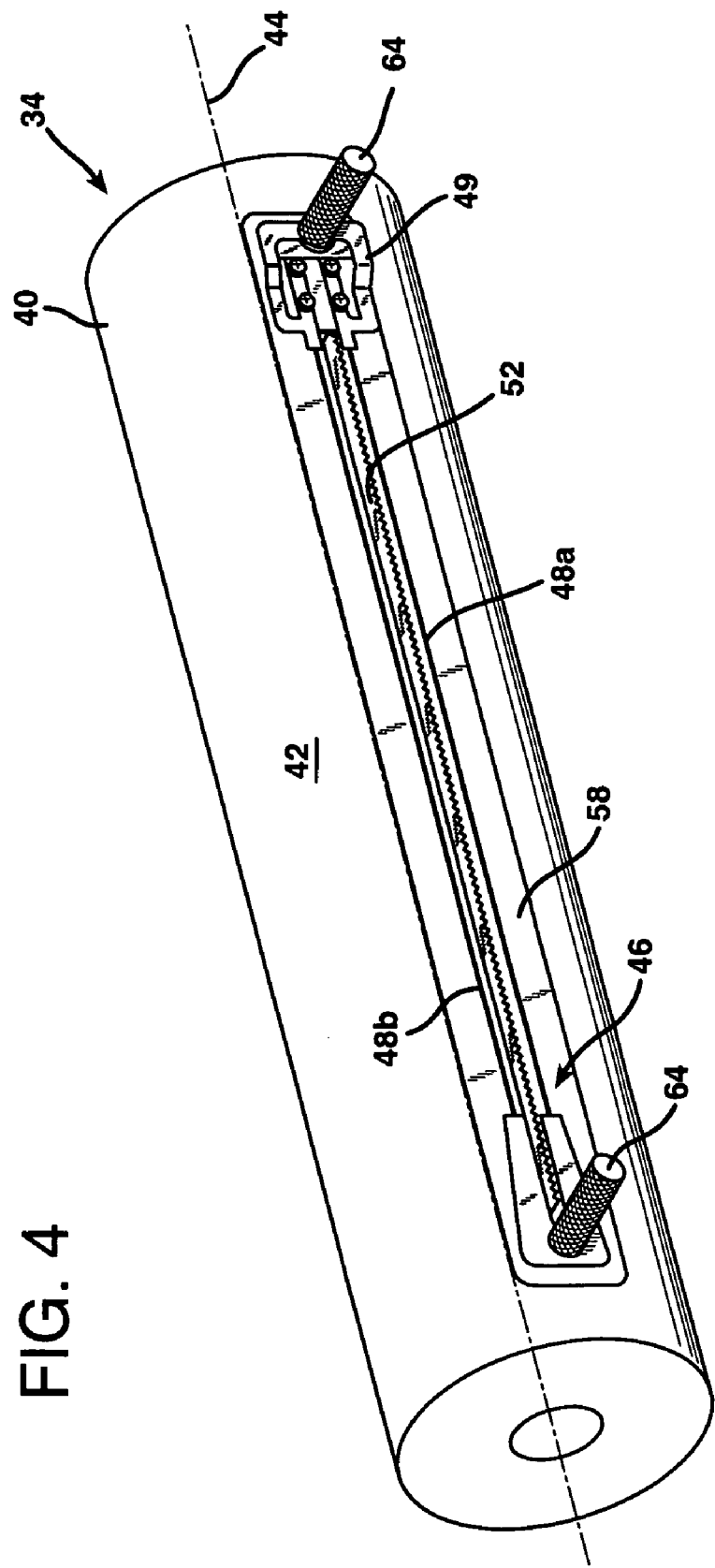
FIGS. 4–5 are perspective views of a rotary transverse sealing device that may be used in accordance with the present invention.
Figure 5:
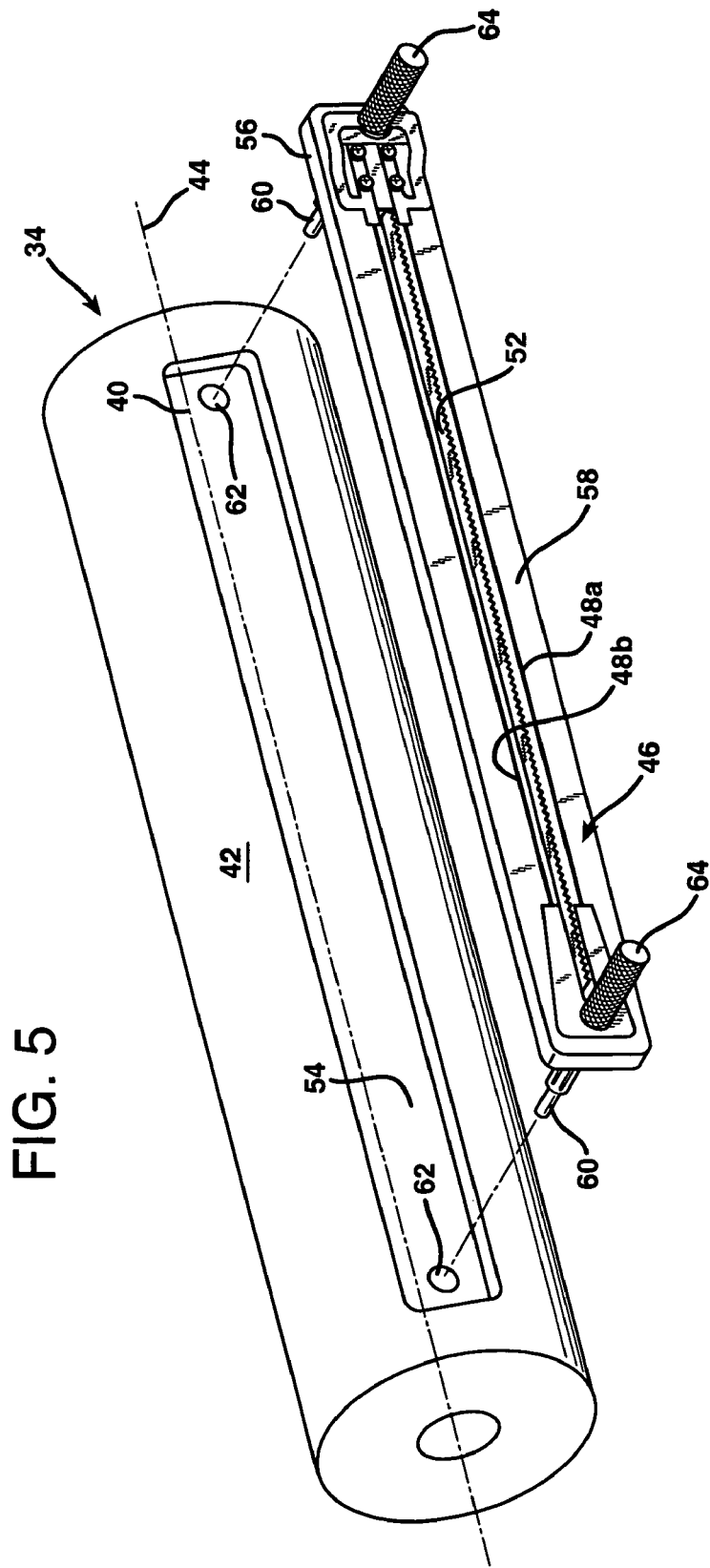

Accordingly, as shown in FIGS. 4–5, sealing roller 34 may comprise a rotatable support cylinder 40 having an outer, circumferential surface 42 and an axis 44 about which the cylinder rotates. In addition, a heating element 46 may be affixed to the outer surface 42 in substantial alignment with axis 44. In this manner, first rotary sealing device 20 may form transverse seals 26 when sealing roller 34 is brought into rotational contact with one of film plies 16 or 18 and heating element 46 is heated to a sealing temperature sufficient to cause the film plies to seal together.

For example, heating element 46 may comprise a pair of sealing members 48a, b that produce the pair 26a, b of transverse seals 26 each time the sealing members 48a, b are brought into contact with film web 14, e.g., with each rotation of cylinder 40. That is, sealing members 48a, b produce corresponding transverse seals 26a, b with each rotation of cylinder 40, with seal 26b belonging to a downstream container 28 and seal 26a belonging to an adjacent upstream container (see FIG. 3). Alternatively, if two heating elements 46 are arrayed on the surface 42 of cylinder 40, then two pairs 26a, b of transverse seals 26 would be created with each rotation of cylinder 40. Similarly, three heating elements 46 on cylinder 40 product three pairs 26a, b of seals 26 with each rotation, etc.

Sealing members 48a, b may be resistive elements, which produce heat when electricity is supplied thereto (source not shown), and can have any desired shape or configuration. As shown, members 48a, b are in the form of substantially parallel wires, which produce a pair of substantially parallel heat seals 26a, b in film web 12 when brought into contact therewith, e.g., with each rotation of cylinder 40.

In addition to the substantially linear seals 26 that are depicted in the drawings, other shapes and patterns may also be formed, such as substantially non-linear seals, e.g., undulating seals that produce a pattern of interconnected bubbles, seals with a combination of linear and non-linear segments (described below), 'zig-zag' seal patterns, etc.

If necessary or desired, a heat transfer medium may be placed between the sealing members 48a, b and the film web 14, such as a coating of PTFE, e.g., TEFLON tape, polyester, or other material capable of withstanding the heat from the sealing members and transferring the same to the film web in a sufficient amount to create seals 26. If employed in this manner, any such heat transfer medium may be an integral part of heating element 46.

Upon completion of the individual inflated articles 12, their separation from one another and/or from film web 14 may be facilitated by including lines of weakness 50 between adjacent articles (see FIGS. 2–3). Accordingly, apparatus 10 may advantageously include means for producing such lines of weakness. This may be accomplished by adapting first rotary sealing device 20 to produce lines of weakness 50 between containers 28, e.g., either between each container as shown or between groups of two or more containers if desired. For example, a device for creating lines of weakness 50 may be incorporated into or onto, e.g., affixed to, first rotary sealing device 20 at outer surface 40 thereof.

A suitable device for creating lines of weakness 50 is a perforation blade 52, which produces a perforation-type line of weakness. As shown in FIGS. 4–5, perforation blade 52 may be included as a component of heating element 46. Blade 52 may be serrated as shown to produce a row of perforations in film web 14, which form the lines of weakness 50 in film web 14 to allow easy tearing therethrough.

In some embodiments, perforation blade 52 (or other type of perforation device) may be disposed between sealing members 48a, b as shown. Such positioning conveniently facilitates the placement of line of weakness 50 between transverse seals 26a, b of adjacent containers 28. Moreover, the creation of a line of weakness 50 in this manner occurs simultaneously with the creation of seals 26a, b. However, line of weakness 50 could also be formed in a separate step, e.g., with a perforation device that is separately positioned and independently operated from first rotary sealing device 20 if desired.

FIGS. 1–3 show each container 28/inflated article 12 separated by a line of weakness 50. However, if desired, fewer numbers of weakness lines 50 may be employed such that not every container is separated from an adjacent container by a line of weakness. For example, a perforation blade could be independently operated and/or separately positioned to create lines of weakness between any desired number of containers, e.g., between every other container, every third container, every tenth container, etc. This may be desirable when making complex cushions containing groups of two or more inflated articles.

Referring still to FIGS. 4–5, heating element 46 may be removably affixed to support cylinder 40 as an integral unit. Thus, when the sealing members 48a, b and/or perforation blade 52 become worn, the entire heating element 46 may be removed and replaced as a unit without the need to replace individual components of the heating element. Accordingly, support cylinder 42 may include a depression 54 in outer surface 42 thereof in which the main body 56 of heating element 46 may be contained, so that outer surface 58 of body 56 is substantially flush with the outer surface 42 when body 56 is positioned within the depression 54 (see FIG. 5). Heating element 46 may be attached to cylinder 40 via any suitable means, such as a pair of retaining pins 60 on heating element 46, which may be retained in corresponding sockets 62 in depression 54 of cylinder 40, e.g., via friction fit, to provide mechanical attachment of the heating element to the cylinder (FIG. 5). A pair of protuberances, i.e., knobs, 64 may be included on outer surface 58 of heating element 46 to provide grasping surfaces to facilitate the manual removal and replacement of the heating element.

When sealing members 48 are wires or other devices that generate heat by providing resistance to the flow of electrical current therethrough, retaining pins 60 may be electrically connected to sealing members 48a, b, and thereby provide electrical communication between a source of electricity (not shown) and the sealing members. A suitable type of pin in this regard is known as a "banana plug." Thus, for example, a carbon-brush commutator and slip ring may be used to transfer electricity from a static source, e.g., a wire from a wall socket, to the rotating sealing members 48, whereby the carbon brushes are stationary and transfer electrical current to the slip ring, which is attached to and rotates with cylinder 40. The slip ring, in turn, is in electrical communication with sockets 62. Thus, when "banana-plug" or other electrically-conductive retaining pins 60 are inserted into sockets 62, current can be made to flow through, and thereby heat, sealing members 48.

As noted above, second rotary sealing device 24 produces longitudinal seal 32 between film plies 16, 18, which intersects pair 26a, b of transverse seals 26 to enclose gas 30 within container 28. In this manner, containers 28 are converted into inflated articles 12. This essentially completes the process of making inflated containers.

As shown in FIGS. 1–3, second rotary sealing device 24 may include a sealing roller 66 and a backing roller 68. As with the first rotary sealing device 20, the sealing and backing rollers 66, 68 of device 24 rotate against one another to create a 'nip,' or area of tangential contact, therebetween, which exerts a rotational compressive force on film web 14. As such, sealing and backing rollers 66, 68 may facilitate the conveyance of the film web through apparatus 10 when the rollers rotate in the direction indicated by the rotational arrows, which thereby drives the film web in a forward direction as indicated by the linear arrows. Thus, the rotation of one or both of rollers 66, 68 may be powered by a suitable drive mechanism, e.g., motor 70, which is shown schematically in FIG. 3.

Longitudinal seal 32 may be any type of seal that bonds two film plies together, such as a heat seal, adhesive seal, cohesive seal, etc., with a heat seal being preferred. Longitudinal seal 32 is generally oriented in a direction that is substantially parallel to the direction of movement of film web 14 along its travel path through apparatus 10. As shown in FIGS. 2–3, seal 32 may be a continuous longitudinal seal, i.e., a substantially linear, unbroken seal, which is interrupted only when second rotary sealing device 24 is caused to stop making the seal. Thus, sealing roller 66 may be heated in any suitable manner to produce a continuous longitudinal seal 32 as shown.

Figure 8:
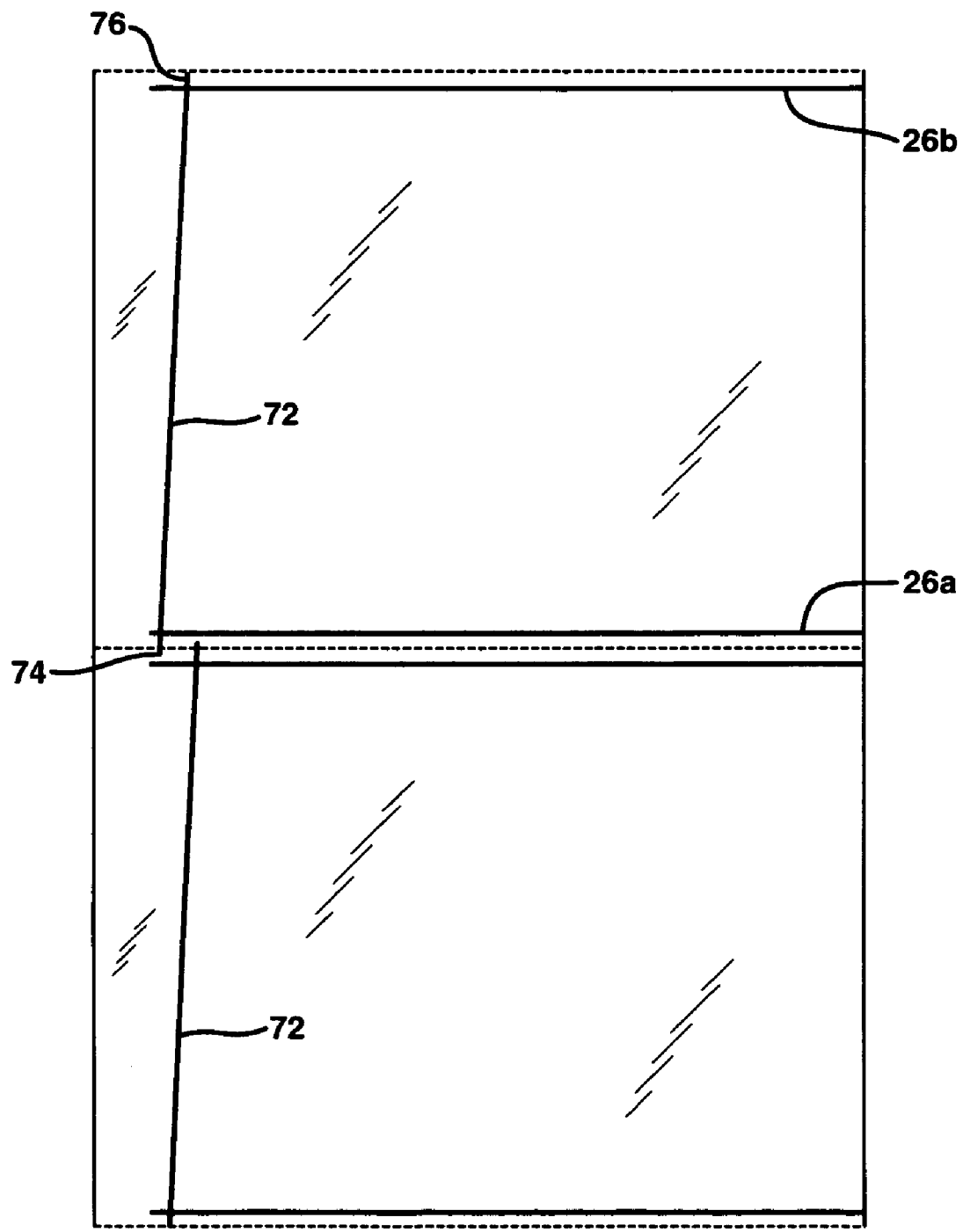
FIG. 8 is a plan view of inflated containers resulting from the use of the rotary longitudinal sealing devices shown in FIG. 6 or 7.

As an alternative to a continuous longitudinal seal 32 as shown in FIGS. 2–3, second rotary sealing device 24 may be adapted to produce a discontinuous series of longitudinal seals 72, as shown in FIG. 8. When this embodiment is employed, the first and second rotary sealing devices 20, 24 are synchronized such that each longitudinal seal 72 intersects the pair 26a, b of transverse seals 26 to enclose gas 30 within containers 28.

Figure 7:
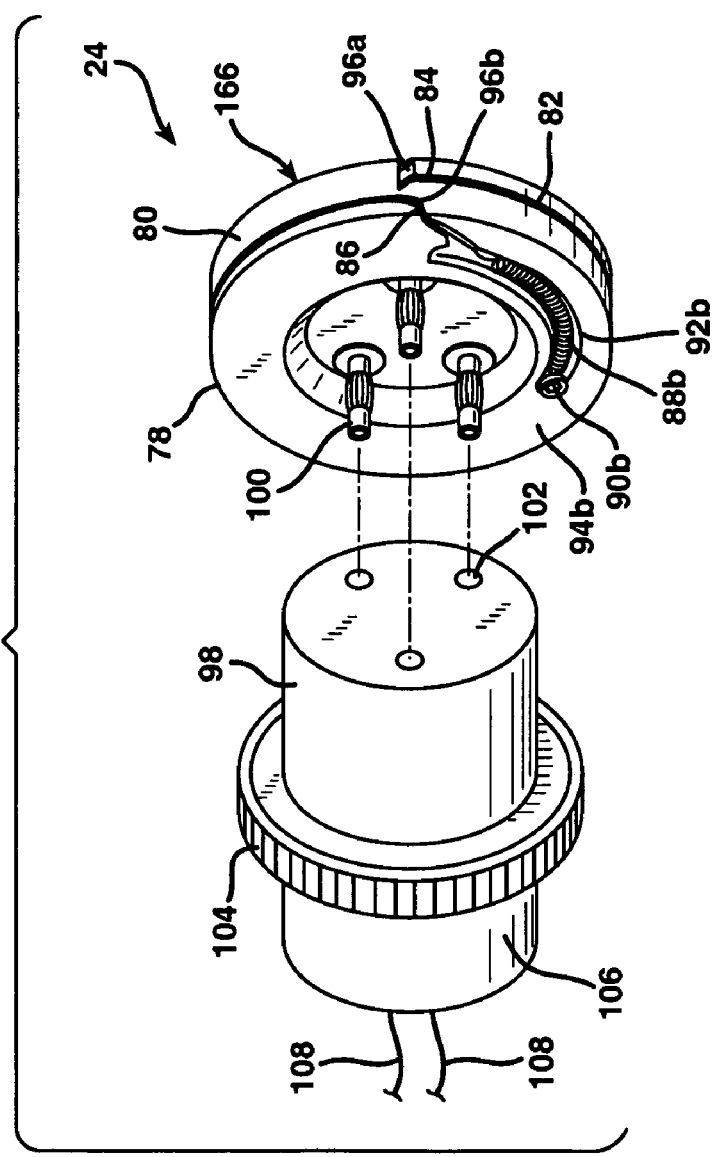
FIG. 7 is a perspective view of an alternative rotary longitudinal sealing device that may be used in accordance with the present invention.
Figure 6:
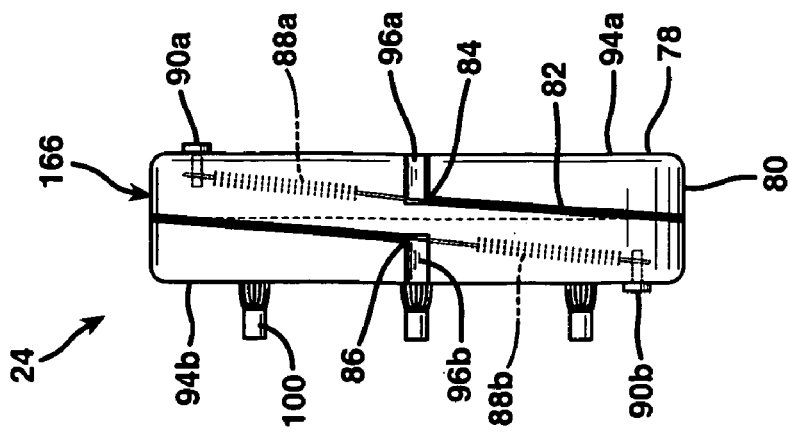
FIG. 6 is an elevational view of a rotary longitudinal sealing device that may be used in accordance with the present invention.

A discontinuous series of longitudinal seals 72 will result when sealing roller 166, as depicted in FIGS. 6–7, is used in place of sealing roller 66 in apparatus 10, i.e., as an alternative sealing roller in second rotary sealing device 24. Sealing roller 166 may, as shown in FIGS. 6–7, include a rotatable support cylinder 78 having an outer, circumferential surface 80, and a heating element 82 disposed about at least a portion of the outer surface 80. Heating element 82 may be secured to cylinder 78 such that the heating element rotates with the cylinder.

Heating element 82, and also sealing members 48a, b, may include one or more metallic wires or wires made from another electrically conductive material; one or more metallic ribbons; circuit-printed plastic ribbons, e.g., metal printed on a plastic substrate comprising polyethylene terephthalate (PET); and other suitable electrically conductive devices. Examples of suitable metallic materials include, e.g., nichrome, steel, etc. When heating element 82 or sealing members 48a, b are in the form of a wire or ribbon, it may have any desired cross-sectional shape, including round, square, oval, rectangular, etc. Heating element 82 and sealing members 48a, b may be made by any conventional method. One method that has been found suitable is to chemically-etch a metallic plate of a desired thickness, e.g., 316 stainless steel, into a desired pattern. Using this method, the heating element 82, as well as the twin sealing members 48a, b, may each be formed from a single, continuous piece of metal.

Support cylinder 78 may be formed from any material that is capable of withstanding the temperatures generated by heating element 82. Such materials include metal, e.g., aluminum (preferably electrically-insulated); high-temperature-resistant polymers, e.g., polyimide; ceramics; etc. A groove may be provided in outer surface 80 to accommodate heating element 82 and keep the heating element in proper position on the outer surface of cylinder 78.

If desired or necessary, a heat transfer medium may be fastened to outer surface 80 such that it is positioned between heating element 82 and the film web 14, such as a coating of PTFE, e.g., TEFLON tape, polyester, or other material capable of withstanding the heat from the heating element and transferring the same to the film web in a sufficient amount to create the longitudinal seals 32, 72. Such a heat transfer medium may be desirable in some applications in order to prevent the heating element from burning through the film web.

As shown in FIGS. 6–7, heating element 82 may have a first end 84 disposed on the outer surface 80 of cylinder 78, and a second end 86 disposed on the outer surface 80. As shown, the first and second ends 84, 86 are spaced from one another such that the heating element 82 forms a helical pattern on cylinder 78. Such helical pattern results in the angled pattern of the longitudinal seals 72 shown in FIG. 8. At the same time, the helical pattern allows for expansion and contraction of the heating element 82 without breaking or becoming loose on surface 80. Expansion and contraction of the heating element 82 occurs due to temperature changes in the heating element as it is heated up, e.g., during a warming up period after being idle, or when it is cooled down, e.g., after apparatus 10 has been turned off after a period of use.

The expansion/contraction of heating element 82 may be further accommodated by including springs 88a, b at respective ends 84, 86 of heating element 82. The springs may be an integral part of heating element 82, or simply connected to ends 84, 86 thereof, and may be secured to cylinder 78 via fasteners 90a, b as shown. Springs 88a, b may advantageously exert a tensioning force on heating element 82, and thereby keep it taught on surface 80 regardless of whether the heating element is in an expanded or contracted state. The springs 88a, b may be contained within grooves 92a, b in the sides 94a, b of cylinder 78 (groove 92a not shown). Slots 96a, b may be included to provide a static (steady state temperature) and dynamic (changing temperature) passage between grooves 92a, b and surface 80 for heating element 82.

Similarly, heating element 46 may include a bendable junction 49 at one end (or at both ends) of sealing members 48a, b, which allows the sealing members 48a, b to independently expand and contract with temperature changes.

Accordingly, second rotary sealing device 24 forms longitudinal seals 72 when cylinder 78 of the device is brought into rotational contact with film plies 16, 18 and heating element 82 is heated to a sealing temperature sufficient to cause the film plies to seal together. Although the axis of cylinder 78 is shown substantially perpendicular to the longitudinal travel path of film web 14, it may assume any desired angle to facilitate sealing the formation of the longitudinal seals 72. For example, in some applications, the angle may vary between 0 and 10 degrees from perpendicular, e.g., 5 degrees towards inflation assembly 22, to accommodate any changes in the travel path of film web 14, which sometimes occurs as the containers 28 are inflated.

In some embodiments, the cylinder 78 and heating element 82 of second rotary sealing device 24 may be removable and replaceable as an integral unit. In this manner, when heating element 82 becomes worn, the entire sealing roller 166 may be manually removed and replaced with a fresh sealing roller 166 without the need to remove a worn a heating element 82 and install a new one on cylinder 78. This feature thus facilitates the serviceability of apparatus 10 for the end-user.

Sealing roller 166 may be removably attached to apparatus 10 in any suitable manner. For example, the sealing roller may be attached to a rotatable hub 98 via retaining pins 100 on sealing roller 166, which are retained in corresponding sockets 102 in hub 98, e.g., via friction fit, to provide mechanical attachment of the sealing roller to the hub. Rotatable hub 98 may be a permanent fixture of apparatus 10. Rotation of the hub may be facilitated by the inclusion of gear ring 104, which may be connected to motor 70 via direct gear drive or indirectly, e.g., via a drive belt or drive chain.

When heating element 82 is a wire or other device that generates heat by providing resistance to the flow of electrical current therethrough, retaining pins 100 may be electrically connected to heating element 82, and thereby provide electrical communication between a source of electricity and the heating element. As noted above, a suitable type of pin in this regard is known as a "banana plug." Thus, for example, a carbon-brush commutator/slip-ring combination 106 may be used to transfer electricity from a static source, e.g., wires 108 from a wall socket or other source, to the rotating hub 98 and sealing roller 166. Thus, the carbon brushes in commutator 106 may remain stationary, i.e., non-rotating, and transfer electrical current to the slip ring, which is attached to and rotates with gear ring 104, hub 98, and sealing roller 166. The slip ring, in turn, is in electrical communication with sockets 102, e.g., via internal wire routing within hub 98. Thus, when "banana-plug" or other electrically-conductive retaining pins 100 are inserted into sockets 102, current can be made to flow through, and thereby heat, heating element 82.

As noted above, when producing a discontinuous series of longitudinal seals 72, as shown in FIG. 8, the first and second rotary sealing devices 20, 24 are synchronized such that each longitudinal seal 72 intersects the pair 26a, b of transverse seals 26 to enclose gas 30 within containers 28. Synchronization between the first and second rotary sealing devices 20, 24 may be accomplished, e.g., by providing sealing rollers 34 and 166 with the same diameter, operating both rollers at the same rotational speed, and aligning the relative rotational positions of each roller 34, 166 so that the leading segment 74 of each longitudinal seal 72 intersects the 'downstream' transverse seal 26a and the trailing segment 76 intersects the 'upstream' transverse seal 26b as shown in FIG. 8. That is, the initial rotational position of sealing roller 166 is set so that, e.g., end 86 of heating element 82 creates leading segment 74 of seal 72 just downstream of transverse seal 26a, and that end 84 completes the seal segment 72 just upstream of transverse seal 26b at trailing segment 76.

An alternative sealing device which may be used for second rotary sealing device 24 is a type of device known as a "drag sealer," which includes a stationary heating element that is placed between a pair of rotating nip rollers and in direct contact with a pair of moving film plies to create a continuous longitudinal seal. Such devices are disclosed, e.g., in U.S. Pat. Nos. 6,550,229 and 6,472,638, the disclosures of which are hereby incorporated herein by reference. A further alternative sealing device which may be used for second rotary sealing device 24 is a type of device known as a "band sealer," which includes a pair of sealing bands that counter-rotate against one another around a plurality of guide rollers, with a heating element in contact with the inner track of one or both bands. A pair of film plies move between, and are sealed together by, the bands. Such devices are disclosed, e.g., in U.S. Ser. No. 10/979,583, filed Nov. 2, 2004, the disclosure of which is hereby incorporated herein by reference.

Backing rollers 36 and 68 may both be formed from a pliant material, such as, e.g., rubber or RTV silicone. Other materials, e.g., metal rollers with a knurled surface, may also be used as desired.

Film web 14 may, in general, comprise any flexible material that can be manipulated by apparatus 10 to enclose a gas as herein described, including various thermoplastic materials, e.g., polyethylene homopolymer or copolymer, polypropylene homopolymer or copolymer, etc. Non-limiting examples of suitable thermoplastic polymers include polyethylene homopolymers, such as low density polyethylene (LDPE) and high density polyethylene (HDPE), and polyethylene copolymers such as, e.g., ionomers, EVA, EMA, heterogeneous (Zeigler-Natta catalyzed) ethylene/alpha-olefin copolymers, and homogeneous (metallocene, single-cite catalyzed) ethylene/alpha-olefin copolymers. Ethylene/alpha-olefin copolymers are copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches, including linear low density polyethylene (LLDPE), linear medium density polyethylene (LMDPE), very low density polyethylene (VLDPE), and ultra-low density polyethylene (ULDPE). Various other polymeric materials may also be used such as, e.g., polypropylene homopolymer or polypropylene copolymer (e.g., propylene/ethylene copolymer), polyesters, polystyrenes, polyamides, polycarbonates, etc. The film may be monolayer or multilayer and can be made by any known extrusion process by melting the component polymer(s) and extruding, coextruding, or extrusion-coating them through one or more flat or annular dies.

Referring back to FIGS. 1–3, many configurations for film web 14 are possible. For example, film web 14 may have a closed longitudinal edge 110 and an opposing open longitudinal edge 112. Open longitudinal edge 112 provides openings into the containers 28 into which gas 30 may be directed. Closed longitudinal edge 110 may be formed by 'center-folding' film web 14 at edge 110 such that each of film plies 16, 18 have substantially the same dimension. Suitable center-folding devices and methods are well-known in the art. Center-folding may be performed at any desired time, e.g., shortly after the film is produced and/or just before being wound onto a supply roll (not shown) for later use with apparatus 10. Alternatively, a center-folding device may be added to or used with apparatus 10 at some point downstream of the supply roll.

As a further alternative, separate film plies 16, 18 may be juxtaposed and sealed together along adjacent longitudinal side edges, e.g., via heat-sealing, to form closed longitudinal edge 110. As a further alternative, film web 14 may be a flattened tube, i.e., with two opposing folded/closed longitudinal edges, wherein one of the longitudinal edges is slit at some point 'upstream' of inflation assembly 22 to form open edge 112.

Because apparatus 10 inflates the film web 14 from one edge thereof, a variety of web widths may be accommodated by the apparatus, thereby making inflated articles having a variety of widths ranging, e.g., from 4 inches to 20 inches. Similarly, the inflated articles may have any desired length, depending on the diameter of sealing roller 34, the number and spacing of heating elements 46 thereon, etc.

As noted above, the transverse seals 26 produced by first rotary sealing device 20 preferably include a pair of transverse, spaced-apart seals 26a and 26b that define, along with closed longitudinal edge 110 of film web 14, each of the containers 28. As shown, the transverse seals 26a, b may extend from the closed longitudinal edge 110 and terminate a predetermined distance from the open longitudinal edge 112 such that each of the juxtaposed film plies 14, 16 have flanges 114 at the open longitudinal edge that are not bonded together. As shown, such flanges 114 extend along the open longitudinal edge 112. Thus, flanges 114 are longitudinally extending edge sections of film plies 14, 16 that extend beyond the ends 116 of seals 26 and, therefore, are not bonded together, i.e., by seals 26 or any other means. The purpose for such flanges is explained immediately below. However, it is to be understood that the present invention is not limited to film webs having such un-bonded flanges, as many other configurations are possible, e.g., edge 112 could be a closed edge, thereby forming an inflation channel that extends longitudinally between ends 116 and such closed edge.

As explained hereinabove, apparatus 10 further includes an inflation assembly 22 for inflating the containers 28. The inflation assembly 22 inflates the containers 28 by directing a stream of gas, indicated by arrows 30, into the opening of each container at open longitudinal edge 112. Inflation assembly 22 includes a nozzle 118 from which the stream of gas 30 exits the inflation assembly, and a source 120 of gas 30 (see FIGS. 1–3). Gas 30 may be, e.g., air, nitrogen, carbon dioxide, etc. Gas source 120 may provide compressed gas, e.g., from one or more tanks or from a central compressor that supplies compressed air to an entire facility (sometimes known as "plant air.")

As illustrated, gas source 120 is a small air compressor or blower, which may be a component of apparatus 10 and be powered by motor 122 as shown. Blower 120 can be operated such that it delivers a steady stream of air 30 or, if desired, in a pulsating mode such that it delivers rapid pulses of air into the containers 28. This may be advantageous if film plies 16, 18 cling together, which can occur in thermoplastic films, particularly in warmer operating conditions. When this occurs, pulsing the air 30 from blower 120 may help to separate the film plies and inflate the containers 28 without putting undue stress on the transverse and longitudinal seals.

If desired, apparatus 10 may further include a sensor to detect whether a predetermined minimum amount of gas has been directed between film plies 16, 18. The sensor may generate a signal, which varies depending upon whether such predetermined minimum amount of gas has been directed between the film plies. Further, inflation assembly 22 may be adapted to receive the signal and to direct gas between the film plies at a variable rate of speed, which depends upon the signal as received from the sensor. The rate of speed at which inflation assembly operates may advantageously be faster when the predetermined amount of gas is not detected verses when such predetermined amount of gas has been detected.

For example, an optical sensor 121 may be employed to detect whether a container 28 that is being inflated has reached a desired level of inflation, e.g., based on a minimum height reached by the container as it is transformed from a flat, un-inflated container to a swollen, gas-filled container, which causes the upper film ply 16 to be lifted upwards (or outwards if a vertical travel path is used) by the increasing gas pressure within the container. Until the sensor 121 "sees" the film ply 16 reach a certain height, the blower 120 can be made to operate at a relatively high rate of speed, generating a relatively high gas flow rate and/or high gas pressure out of nozzle 118. Once the sensor 121 detects film ply 16 at a predetermined minimum height, which height is shown for example in FIG. 1, it may send a signal 123 to motor 122 (or to an appropriate control means therefor, e.g., the power source for motor 122), to reduce the operating speed of blower 120. In this lower-speed operating mode, the now-inflated container 28 is maintained at a desired level of inflation while the longitudinal seal 32, 72 is completed for such container, thereby minimizing the tensional stress put on the newly formed longitudinal seal (and transverse seals) due to a lower inflation pressure within the container. When the next container 28 moves into position to be inflated, i.e., in front of inflation assembly 22, sensor 121 will no longer "see" film ply 16, and signal 123 to motor 122 may change in such a manner that the operating speed of blower 120 again increases. In this fashion, a greater level of assurance may be provided that the containers 28 will be fully and/or consistently inflated. Stated differently, a greater percentage of the containers will be fully and/or consistently inflated while, at the same time, minimizing stress on the newly-formed longitudinal and transverse seals, and also saving energy.

As shown in FIGS. 1–2, nozzle 118 may protrude into the open longitudinal edge 112 to effect the inflation of containers 28. When film web 14 contains flanges 114 as described above, at least a portion of the nozzle 118 may be positionable between the flanges 114 so that, as film web 14 is conveyed along its travel path through apparatus 10, the nozzle moves longitudinally between the flanges. Alternatively, if edge 112 is a closed edge, a slitter may be positioned upstream of nozzle 118 to slit such edge and thereby allow the nozzle to remain in positioned between the film plies 16, 18 as shown. In both cases, nozzle 118 may remain in a fixed position while film web 14 moves continuously past the nozzle.

Figure 9:
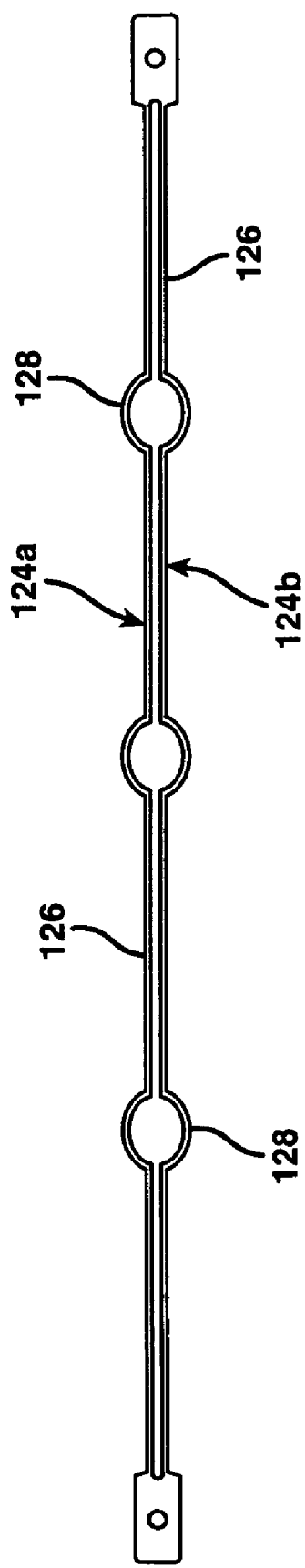
FIG. 9 is an alternative pair of sealing members that may be used to make transverse seals in accordance with the invention.
Figure 10:
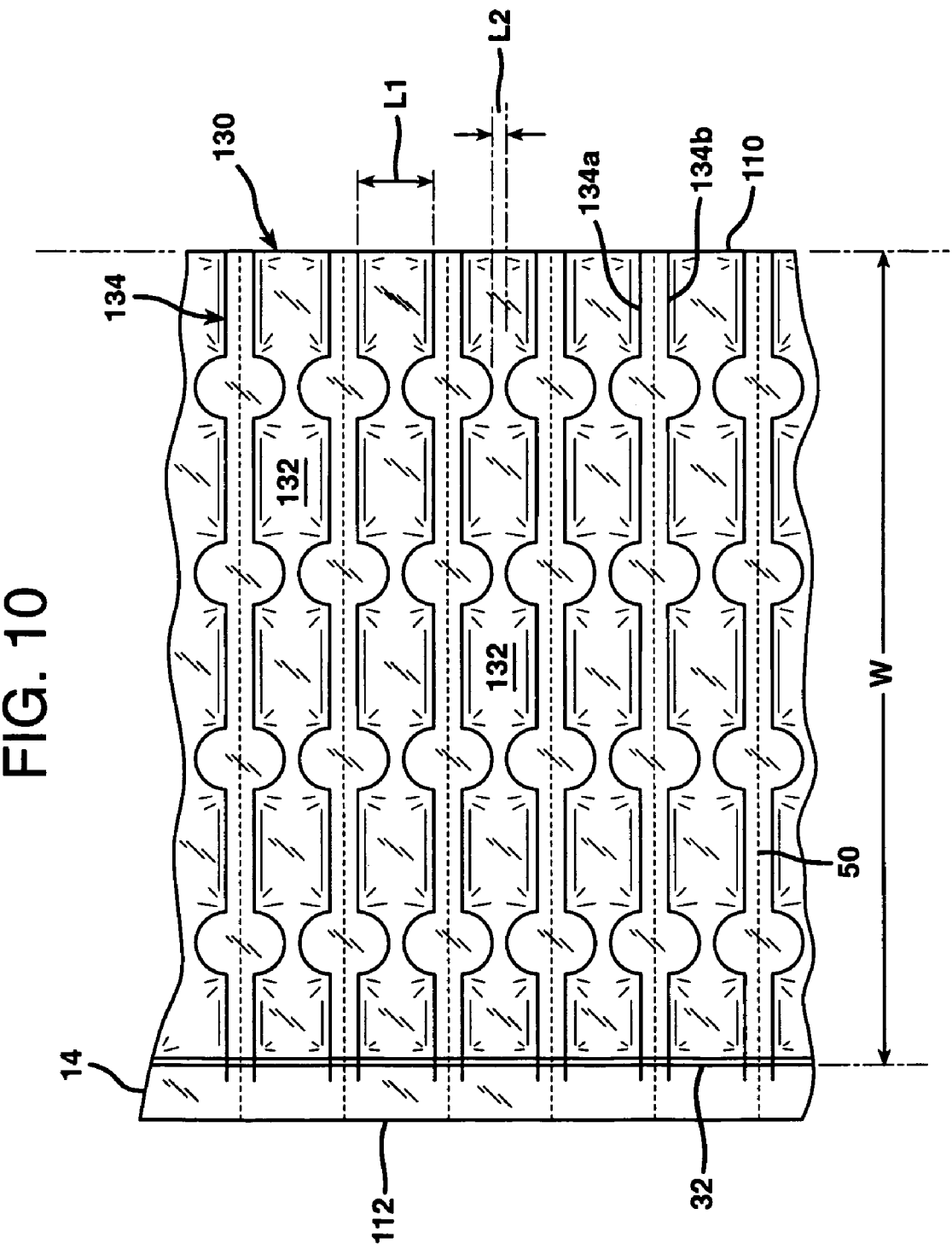
FIG. 10 is a series of inflated articles produced from the sealing members shown in FIG. 9.

As shown in FIGS. 4–5, heating element 46 for first rotary sealing device 20 includes a pair of substantially linear sealing members 48a, b. Alternatively, sealing device 20 may employ a heating element similar to heating element 46 on support cylinder 40, but which includes, instead of sealing members 48a, b, sealing members 124a, b as shown in FIG. 9. As shown, each sealing member 124a, b includes substantially linear regions 126 and non-linear regions 128. The use of sealing members 124a, b in place of sealing members 48a, b in first rotary sealing device 20 results in the cushion 130 shown in FIG. 10, which comprises inflated articles 132. The inflated articles 132 result from containers having the same seal pattern shown in FIG. 10, wherein such containers have been inflated by inflation assembly 22 and sealed closed via second rotary sealing device 24 to produce longitudinal seal 32 (or seals 72 if desired). As described in further detail below, the inflated articles 132 differ from inflated articles 12 in that inflated articles 132 each have at least one change in longitudinal dimension along their transverse width.

A pair of seals 134a, b may be made simultaneously by sealing members 124a, b, with seal 134a corresponding to sealing member 124a and seal 134b corresponding to sealing member 124b. Such transverse seals 134 bond the film plies 16, 18 together to form inflated articles 132 having a predetermined transverse width "W." Inflated articles 132 also have at least one change in longitudinal dimension along their transverse width W.

Thus, for example, inflated articles 132 may have two different longitudinal dimensions, L1 and L2 as shown, with alternating changes occurring between those two dimensions along the transverse width W of each container. Dimension L1 corresponds to the space between sealing members 124a, b at the substantially linear regions 126 thereof, while the smaller dimension 12 corresponds to the smaller space between the non-linear regions 128 of sealing elements 124a, b. In use, the portions of the inflated article having the larger dimension L1 provide cushioning while the portions having the smaller dimension L2 provide flexibility, e.g., to allow it to be bent or folded at such smaller dimension portions in order to wrap around and more closely follow the contour of an object to be packaged.

Although the non-linear regions 128 are illustrated as having a curved, semi-circular shape, the non-linear regions can have any shape that deviates from the otherwise lineal shape of the sealing elements 124a, b in order to create inflated articles having at least one change in longitudinal dimension along their transverse width W.

If desired, each container/inflated article 132 may be separated by a line of weakness 50 as shown, which may be formed as described above (e.g., with a perforation blade 52 positioned between the sealing members 124a, b). Alternatively, groups of two or more such inflated articles may be separated by a line of weakness, i.e., not every container/inflated article 132 need be separated by a line of weakness.

Figure 11:
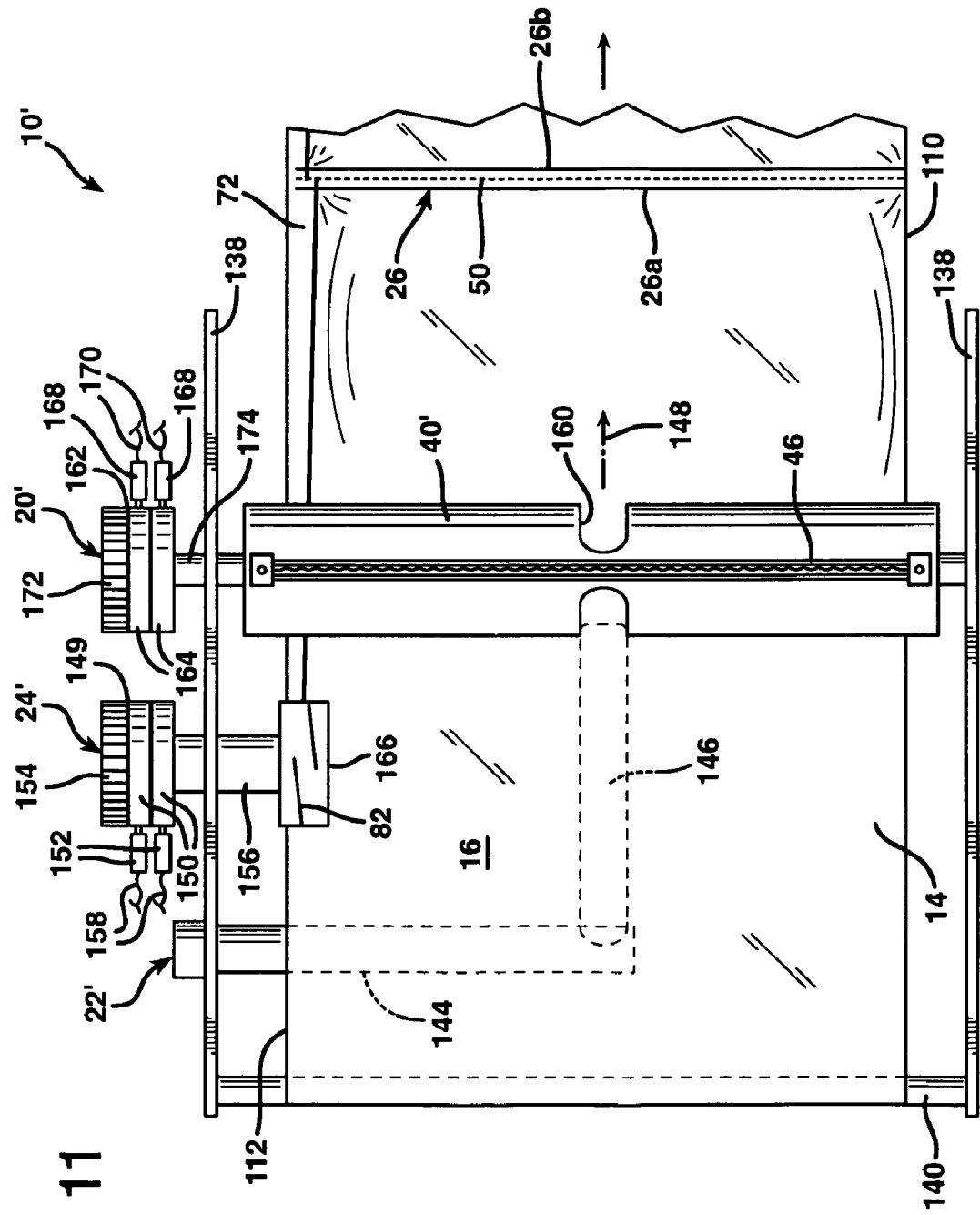
FIG. 11 is an alternative embodiment of the invention.

FIG. 11 is an alternative embodiment of the invention, wherein like reference numbers refer to like components as discussed hereinabove. Apparatus 10' is similar to apparatus 10, except that 1) the second rotary sealing device for making longitudinal seals is positioned upstream of first rotary sealing device for making transverse seals, and 2) the inflation assembly comprises an extended manifold to position the nozzle near the center of the film web.

FIG. 11 is a plan view of apparatus 10', including a frame or housing 138 to which all of the components of apparatus 10' may be mounted, wherein film web 14 is withdrawn from a source, e.g., supply roll or box (not shown), which is positioned beneath the components shown in FIG. 11. For example, a supply roll of film web 14 may be attached to housing 138, such that the film web is withdrawn in an upward direction, and then assumes a horizontal path after passing over guide roller 140. Inflation assembly 22' includes a manifold 144 and an inflation nozzle 146. Manifold 144 and nozzle 146 are positioned between film plies 16, 18. The length of manifold 144 is selected to position nozzle 146 at any desired location within film web 14, e.g., near the transverse center as shown. Manifold 144 may extend through open longitudinal edge 112 in a substantially transverse direction, with nozzle 146 having a longitudinal orientation near the center of the film web as shown. Gas 148 from a gas source (not shown) flows through manifold 144 and out of nozzle 146 within film web 14, i.e., between film plies 16, 18.

Second rotary sealing device 24' for making longitudinal seal segments 72 is positioned downstream of manifold 144 in apparatus 10', and operates generally as described above, except that it creates longitudinal seal segments 72 prior to, i.e., upstream of, the creation of transverse seals 26 by first rotary sealing device 20'. As also described generally above, electricity may be supplied to heating element 82 via a commutator, e.g., commutator 149 as shown, which includes commutator rings 150 and contact brushes 152. Commutator rings 150 are in electrical communication with sealing roller 166, and also rotate therewith, e.g., via axle 156, to which both components are affixed. The rotation of the rings 150 and sealing roller 166 may be effected by suitable mechanical engagement with gear ring 154, which is also affixed to axle 156, such that all three components rotate together in linked fashion. Electricity is supplied to contact brushes 152 via wires 158. Commutator rings 150 rotate against contact brushes 152, which remain stationary and supply electricity for sealing roller 166 via the commutator rings.

First rotary sealing device 20' is positioned downstream of the second rotary sealing device 24', and operates as described above, except that the support cylinder, designated 40', may include a radial groove 160 therein to allow gas 148 to flow past and collect downstream of the cylinder until a final upstream transverse seal 26b is made to enclose the gas 148 between the longitudinal seal 72, film plies 16 and 18, and transverse seals 26a, b, thereby forming an inflated article. Electricity may be supplied to heating element 46 via commutator 162, which may be identical to commutator 149 as described immediately above, including commutator rings 164, contact brushes 168, and wires 170. Gear ring 172 and axle 174 may be provided to facilitate the rotation of cylinder 40. A single motor (not shown) may be used to drive the rotation of both of gear rings 154 and 172, e.g., via belt or chain drive.

Figure 12:
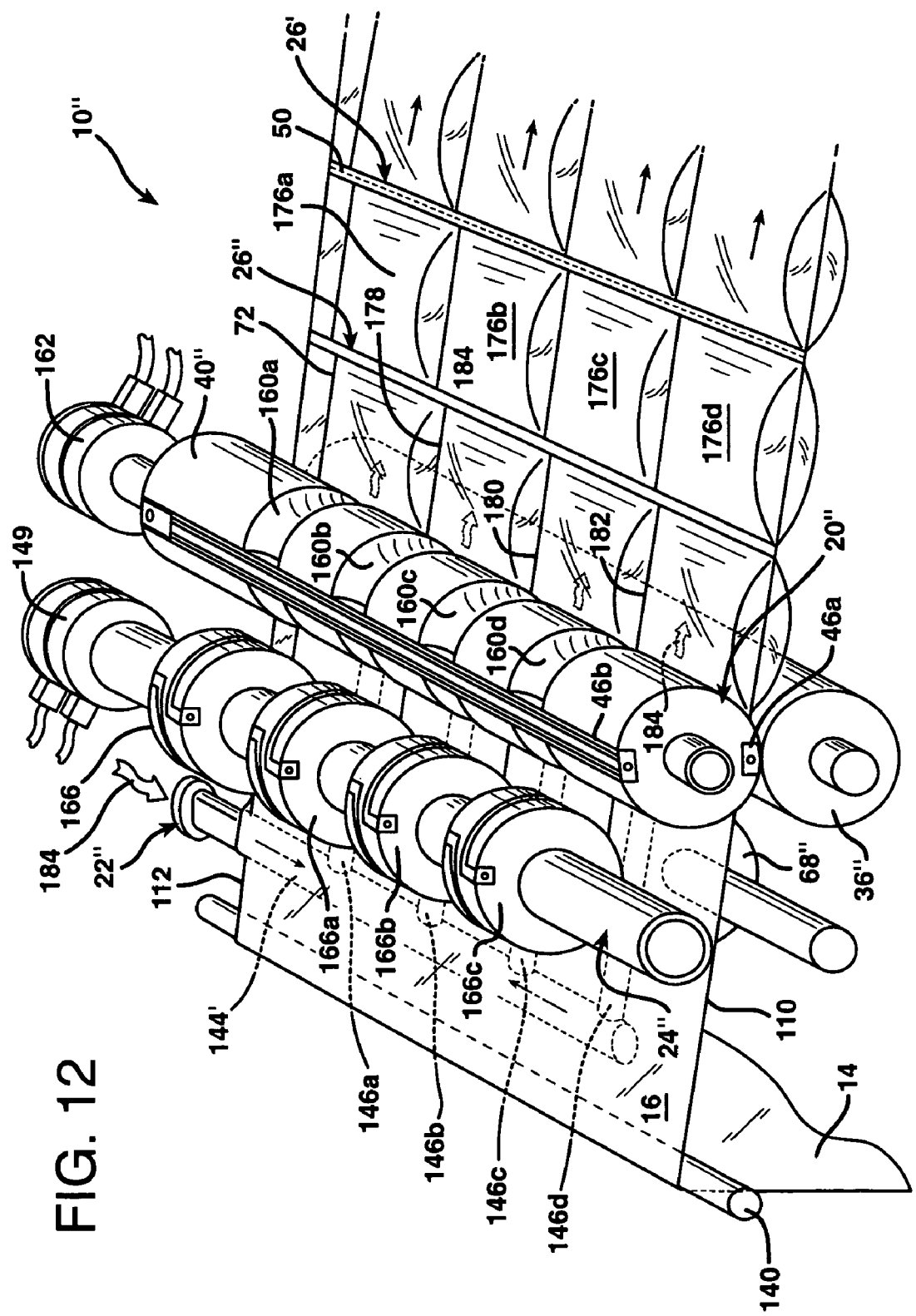
FIG. 12 is a further alternative embodiment of the invention.

Referring to FIG. 12, another alternative embodiment of the present invention will be described, wherein at least a third rotary sealing device is included for producing at least a second longitudinal seal to segment the inflated article into discrete compartments. For example, apparatus 10" is similar to apparatus 10' as described immediately above, except that the second rotary sealing device 24" includes multiple sealing rollers 166 to create one or more additional longitudinal seals, i.e., in addition to longitudinal seals 72, in order to segment the inflated articles into discrete inflated compartments 176. Thus, as shown in FIG. 12, second rotary sealing device 24" may, for example, additionally include a second sealing device 166a for producing longitudinal seals 178, a third sealing device 166b for producing longitudinal seals 180, and a fourth sealing device 166c for producing longitudinal seals 182 to segment the resultant inflated containers 128 into four rows of discrete compartments 176a–d. The sealing rollers 166 and 166a–c may rotate against backing roller 68".

Inflation assembly 22" may include manifold 144' with multiple nozzles 146a–d as shown to direct gas 184 between film plies 16, 18 as shown. This may be facilitated by the inclusion of grooves 160a–d in cylinder 40" of first rotary sealing device 20". As shown, first rotary sealing device 20" may further include a pair of heating elements 46a and 46b, which are positioned opposite one another on cylinder 40", thereby producing twice as many transverse seals 26 as first rotary sealing device 20, which has only one heating element 46. Also, while heating element 46a contains a perforation blade between the sealing members (hidden from view) to create line of weakness 50 between the resultant pair of transverse seals 26', heating element 46b contains no perforation blade. Thus, no line of weakness is formed between the resultant transverse seals 26". Cylinder 40" may rotate against backing roller 36" as shown.

Commutators 149 and 162, as described above, may be used to supply electricity to sealing rollers 166/166a–c and heating elements 46a/46b, respectively.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. An apparatus for making inflated articles from a film web having two juxtaposed film plies, comprising:
   a. a first rotary sealing device for producing transverse seals that bond the film plies together;
   b. an inflation assembly for directing gas between said film plies; and
   c. a second rotary sealing device for producing a discontinuous series of longitudinal seals between said film plies, said first and second rotary sealing devices being synchronized such that each longitudinal seal intersects a pair of said transverse seals,
   whereby, gas is enclosed between said longitudinal seals, transverse seals, and film plies to thereby form an inflated article.

2. The apparatus of claim 1, wherein said apparatus produces a series of two or more inflated articles.

3. The apparatus of claim 2, wherein said apparatus moves the film web continuously and without interruption as said series of inflated articles are produced.

4. The apparatus of claim 1, wherein said second rotary sealing device comprises
   a. a rotatable support cylinder having an outer, circumferential surface; and
   b. a heating element disposed about at least a portion of said outer surface of said cylinder and secured to said cylinder such that said heating element rotates with said cylinder,
   whereby, said second rotary sealing device forms said longitudinal seals when said device is brought into rotational contact with said film plies and said heating element is heated to a sealing temperature sufficient to cause the film plies to seal together.

5. The apparatus of claim 4, wherein
   said heating element has a first end disposed on the outer surface of said cylinder and a second end disposed on the outer surface of said cylinder; and
   said first and second ends are spaced from one another such that said heating element forms a helical pattern on said cylinder.

6. The apparatus of claim 4, wherein said cylinder and said heating element are removable and replaceable as an integral unit.

7. The apparatus of claim 2, wherein said first rotary sealing device produces a line of weakness between said inflated articles.

8. The apparatus of claim 1, wherein said first rotary sealing device comprises
   a. a rotatable support cylinder having an outer, circumferential surface and an axis about which said cylinder rotates; and
   b. a heating element affixed to said outer surface of said cylinder and in substantial alignment with said axis,
   whereby, said first rotary sealing device forms said transverse seals when said device is brought into rotational contact with said film plies and said heating element is heated to a sealing temperature sufficient to cause the film plies to seal together.

9. The apparatus of claim 8, wherein said heating element comprises a pair of sealing members that produce a pair of said transverse seals.

10. The apparatus of claim 9, wherein said heating element further includes a perforation device disposed between said pair of sealing members.

11. The apparatus of claim 8, wherein said heating element is removably affixed to said cylinder.

12. The apparatus of claim 10, wherein said heating element is removably affixed to said cylinder and replaceable thereon as an integral unit.

13. The apparatus of claim 1, wherein said first rotary sealing device makes substantially linear seals.

14. The apparatus of claim 1, wherein said first rotary sealing device makes substantially non-linear seals.

15. The apparatus of claim 1, wherein said inflated articles have a predetermined transverse width and at least one change in longitudinal dimension along their transverse width.

16. The apparatus of claim 15, wherein said first rotary sealing device comprises a sealing member having linear and non-linear regions.

17. The apparatus of claim 1, further including a third rotary sealing device for producing a second longitudinal seal to segment the inflated article into discrete compartments.

18. The apparatus of claim 1, further including a sensor to detect whether a predetermined minimum amount of gas has been directed between said film plies.

19. The apparatus of claim 18, wherein said sensor generates a signal, which varies depending upon whether said predetermined minimum amount of gas has been directed between said film plies; and said inflation assembly is adapted to receive said signal and to direct gas between said film plies at a variable rate of speed, which depends upon said signal received from said sensor.

20. The apparatus of claim 19, wherein said rate of speed is faster when said predetermined amount of gas is not detected than when said predetermined amount of gas is detected.

21. A method for making inflated articles from a film web having two juxtaposed film plies, comprising:

a. producing transverse seals with a first rotary sealing device, said transverse seals bonding the film plies together;

b. directing gas between said film plies; and c. producing a discontinuous series of longitudinal seals between said film plies with a second rotary sealing device, said first and second rotary sealing devices being synchronized such that each longitudinal seal intersects a pair of said transverse seals, whereby, gas is enclosed between said longitudinal seal seals, transverse seals, and film plies to thereby form an inflated article.

* * * * *

UNITED STATES PATENT AND TRADEMARK OFFICE
CERTIFICATE OF CORRECTION

| | |
|---|---|
| PATENT NO. | : 7,225,599 B2 |
| APPLICATION NO. | : 11/099289 |
| DATED | : June 5, 2007 |
| INVENTOR(S) | : Sperry et al. |

It is certified that error appears in the above-identified patent and that said Letters Patent is hereby corrected as shown below:

Column 16, Line 20, "longitudinal seal seals" should be --longitudinal seals--

Signed and Sealed this

Twenty-first Day of August, 2007

JON W. DUDAS
*Director of the United States Patent and Trademark Office*